(12) United States Patent
Zeller et al.

(10) Patent No.: US 11,899,556 B2
(45) Date of Patent: Feb. 13, 2024

(54) COMPUTER-IMPLEMENTED METHOD FOR GENERATING A COMPONENT FAULT AND DEFICIENCY TREE OF A MULTI-COMPONENT SYSTEM COMPRISING A PLURALITY OF COMPONENTS

(71) Applicant: Siemens Aktiengesellschaft, Munich (DE)

(72) Inventors: Marc Zeller, Munich (DE); Lennart Kilian, Gauting (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 52 days.

(21) Appl. No.: 17/683,617

(22) Filed: Mar. 1, 2022

(65) Prior Publication Data

US 2022/0292009 A1   Sep. 15, 2022

(30) Foreign Application Priority Data

Mar. 9, 2021 (EP) .................................. 21161517

(51) Int. Cl.
*G06F 11/00* (2006.01)
*G06F 11/34* (2006.01)
*G06F 11/30* (2006.01)

(52) U.S. Cl.
CPC ...... *G06F 11/3447* (2013.01); *G06F 11/3013* (2013.01)

(58) Field of Classification Search
CPC .................................................. G06F 11/3447
See application file for complete search history.

(56) References Cited

U.S. PATENT DOCUMENTS

2019/0138416 A1* 5/2019 Kaukewitsch ............ G06F 1/18
2022/0058323 A1* 2/2022 Heilmann .......... G05B 23/0248

FOREIGN PATENT DOCUMENTS

EP    3270249 A1    1/2018

OTHER PUBLICATIONS

Kaiser et al., "A New Component Concept for Fault Trees," Proceedings of the 8th Australian Workshop on Safety Critical Systems and Software, vol. 33, pp. 37-46, 2003.

(Continued)

*Primary Examiner* — Amine Riad
(74) *Attorney, Agent, or Firm* — Schmeiser, Olsen & Watts LLP

(57) ABSTRACT

Provided is a computer-implemented method for generating a Component Fault and Deficiency Tree of a multi-component system the method including:
a. modeling the multi-component system using a Component Fault and Deficiency Tree,
b. the Component Fault and Deficiency Tree includes a plurality of component fault and deficiency tree elements associated with the respective components;
c. each component fault and deficiency tree element includes at least one inport and at least one outport;
d. each component fault and deficiency tree element includes at least two events as internal fault tree logic;
e. at least one gate,
f. each component fault and deficiency tree element includes at least one mitigation logic;
g. at least one Boolean AND-Gate, configured to connect the internal fault tree logic and the at least one mitigation logic; and
h. providing the generated Component Fault and Deficiency Tree of the multi-component system as output.

11 Claims, 2 Drawing Sheets

(56) References Cited

OTHER PUBLICATIONS

Kornecki, Andrew et al.: "Fault Tree Analysis for Safety/Security Verification in Aviation Software"; Electronics; vol. 2; No. 4; Jan. 31, 2013 (Jan. 31, 2013); pp. 41-56; XP055828331.

* cited by examiner

COMPUTER-IMPLEMENTED METHOD FOR GENERATING A COMPONENT FAULT AND DEFICIENCY TREE OF A MULTI-COMPONENT SYSTEM COMPRISING A PLURALITY OF COMPONENTS

CROSS-REFERENCE TO RELATED APPLICATIONS

This application claims priority to EP Application No. 21161517.4, having a filing date of Mar. 9, 2021, the entire contents of which are hereby incorporated by reference.

FIELD OF TECHNOLOGY

The following relates to a computer-implemented method for generating a Component Fault and Deficiency Tree of a multi-component system comprising a plurality of components. Further, the following relates to a corresponding computing unit and a corresponding computer program product.

BACKGROUND

The importance of safety-critical systems in many application domains of embedded systems, such as aerospace, railway, health care, automotive and industrial automation is continuously growing. Thus, along with the growing system complexity, the need for safety assurance as well as its effort is increasing in order to guarantee the high-quality demands in these application domains. The aim of safety assurance is to ensure that systems do not lead to hazardous situations which may harm people or endanger the environment.

In the application domains of safety-critical systems, the safety assurance is defined by means of safety standards, such as ISO 26262, ARP4161, EN5129 and IEC 61508.

However, in order to assess Artificial Intelligence (AI)/Machine Learning (ML)-based systems in terms of safety, it is not sufficient to assure the system in terms of possible failure, but the Safety Of The Intended Functionality (SOTIF) must be considered. Therefore, novel safety standards such as ISO 21448 Road vehicles—Safety of the Intended Functionality are created. ISO 21448 defines SOTIF, as the absence of unreasonable risk due to hazards resulting from functional insufficiencies of the intended functionality. Hence, in contrast to the aforementioned traditional safety standards, SOTIF has a different view on the system.

Moreover, safety analysis techniques like Failure Mode and Effect Analysis (FMEA), Failure Modes, Effects and Diagnostic Analysis (FMEDA), or Fault Tree Analysis (FTA) are known from the conventional art to ensure that all identified system hazards have been mitigated sufficiently. In this context, Fault trees (FTs) represent a graphical model of the pathways within a system, such as the aforementioned safety-critical system, that can lead to a failure. The FTs are required as input for the FTA.

Moreover, Component Fault Trees (CFTs) are known from the conventional art, according to which the CFTs are a compositional extension to FTs to better reflect the technical architecture of a system in its safety analysis model.

CFTs are described, e.g., in Kaiser et al., "A new component concept for FTs," Proceedings of the 8th Australian Workshop on Safety Critical Systems and Software, Volume 33, pp. 37-46, 2003. Thereby, CFTs provide a model- and component-based methodology for the FT analysis, which supports a modular and compositional safety analysis strategy. The CFT includes a plurality of elements. The elements are associated with components of the system. The CFT also includes a plurality of interconnections between the elements. The interconnections are associated with functional dependencies between components of the system. Such functional dependencies may model input/output of control signals or flow of forces. The CFT may model an error behavior of the system. The error behavior of the system may be modeled by the CFT using approaches of hierarchical decomposition. Here, the overall behavior of the system can be predicted based on the individual behavior of components. In other words, the causal chain leading to an overall system behavior may be modeled by a causal chain of errors of components. The CFT may include Boolean interconnections between adjacent elements to model propagation of errors throughout the system. The CFT may model the system using a graph; here nodes of the graph may correspond to the elements and edges of the graph may correspond to the interconnections.

The CFT comprises a set of CFT elements where each CFT element is defined by the tuple CFT=(IFM, OFM, B, G, SubCFT, C), comprising a set of input failure modes IFM=, $\{if\ m_1, \ldots, if\ m_n\}$ a set of output failure modes OFM=$\{of\ m_1, \ldots, of\ m_n\}$ a set of internal failure events B=$\{b_1, \ldots, b_r\}$ (so-called basic events), which describe random HW failures of the component a set of Boolean gates G=$\{g_1, \ldots, g_s\}$, where each gate has exactly one output $g_i$.out and one or more inputs $g_i$.in$_j$ as well as a Boolean formula (e.g. g.out=g.in$_1$vg.in$_2$ representing an OR-gate)

a set of sub-CFT elements SubCFT which is defined by the tuple SubCFT=(IN, OUT, cft$_i$), where IN= $\{in_1, \ldots, in_a\}$ is a set of input failure mode, OUT=$\{out_1, \ldots, out_b\}$ a set of output failure modes and cft$_i \in$CFT a mapping to a another CFT element a set of directed edges C with C⊆(IFM∪B∪G.out∪Sub-CFT. OUT)×(OFM∪G.IN∪SubCFT.IN)

Thus, the CFT allows to represent all information of a classical FT, including Common Cause Failures (CCFs), in a modular and hierarchical way.

According to conventional art, however, the functional insufficiencies or deficiencies are neglected in known CFTs. In other words, any hazards coming from failures as well as hazards resulting from functional insufficiencies of the intended functionality to build and assess the safety of systems incorporating AI/ML are not sufficiently mitigated using said traditional safety analysis techniques.

To the contrary, the aforementioned FT and CFT methodologies, solely focus on individual failures of the system and do not consider any insufficiencies of the intended functionality or deficiencies. Hence, the traditional safety analysis techniques are not applicable on AWL-based systems becoming increasingly important with the digitalization.

An aspect relates to provide a computer-implemented method for generating a Component Fault and Deficiency Tree of a multi-component system in an efficient and reliable manner.

SUMMARY

This problem is according to one aspect of embodiments of the invention solved by a computer-implemented method for generating a Component Fault and Deficiency Tree of a multi-component system comprising a plurality of components, wherein each component of the plurality of components of the multi-component system is a hardware component, a software component, or a hardware and software component, the method comprising the steps:
 a. modeling the multi-component system using a Component Fault and Deficiency Tree, wherein
 b. the Component Fault and Deficiency Tree comprises a plurality of component fault and deficiency tree elements associated with the respective components of the multi-component system and
  interconnections between the component fault and deficiency tree elements associated with respective functional dependencies between the components; wherein
 c. each component fault and deficiency tree element comprises at least one inport and at least one outport; wherein
  each component fault and deficiency tree element comprises at least one output failure mode, connected to the at least one outport; wherein
  each component fault and deficiency tree element comprises at least one input failure mode, connected to the at least one inport; wherein
 d. each component fault and deficiency tree element comprises at least two events as internal fault tree logic; wherein
  one event of the at least two events is associated with at least one failure and the other event of the at least two events is associated with at least one deficiency of the component;
 e. at least one gate, configured to connect the at least two events;
 f. each component fault and deficiency tree element comprises at least one mitigation logic; wherein
  the at least one mitigation logic is configured to mitigate the at least one failure and/or at least one deficiency by means of a mitigation measure;
 g. at least one Boolean AND-Gate, configured to connect the internal fault tree logic and the at least one mitigation logic; and
 h. Providing the generated Component Fault and Deficiency Tree of the multi-component system as output.

Accordingly, embodiments of the invention are directed to a computer-implemented method for generating a Component Fault and Deficiency Tree (CFDT) of a multi-component system comprising a plurality of components. Thereby, the traditional Component Fault Tree (CFT) according to steps a. to c. is adapted. More specifically, the CFT with the common failures is extended with deficiencies in step d. The failures and deficiencies are functional failures and functional deficiencies. The multi-component system can be a safety-critical system, or an AI-based or ML-based system with safety-critical functionalities. The components of the multi-component system can be Hardware or Software components.

In other words, the CFT methodology is adapted and hence improved to be able to describe cause-effect-relationships for individual failures as well as functional insufficiencies and system hazards for the specified system. This way, the assurance of AI-based and ML-based system with safety-critical functionalities can be guaranteed.

In order to be able to specify cause-effect-relationships for individual failures as well as functional insufficiencies and system hazards, deficiencies as a concept corresponding to failures is introduced as follows.

The term deficiency used in embodiments of the present invention is the combination of weaknesses or limitations originating from the design or the specification or limitations in the implementation of the intended functionality (e.g. insufficiency of the decision algorithm) and a triggering condition (e.g. according to ISO 21448 a "specific conditions of a driving scenario that serve as an initiator for a subsequent system reaction possibly leading to a hazardous behavior"). Similar to failures, deficiencies can lead to a malfunction or malfunctioning behavior within the system which may lead to a potential hazard at the system boundary.

In the Component Fault and Deficiency Tree (CFDT) according to embodiments of the present invention both failures and deficiencies are incorporated. According to which, the internal fault tree logic in step d. is designed as at least two events. Thereby, one event is associated with a failure and the other event of the at least two events is associated with a deficiency of the component. In this case, the at least one gate is configured to connect the two distinct events. The gate can be designed as Boolean OR-gate or any other Boolean logic. The advantage is that any safety analysis techniques can be applied on AI/ML-based systems.

Therefore, the internal fault tree logic of each component fault and deficiency tree element of the CFDT is designed as at least two events according to step d. The terms such as event, gate and transfer are used in the common sense in context of CFTs. Importantly, the events are not just associated with at least one failure, but additionally with at least one deficiency of the component.

Moreover, each component fault and deficiency tree element comprises at least one mitigation logic according to step e. The mitigation logic is essential to mitigate the at least one failure and/or at least one deficiency by means of a mitigation measure.

In one aspect each component fault and deficiency tree element comprises at least one additional internal fault tree logic; wherein the at least one additional internal fault tree logic is an event, a gate or a transfer.

In one aspect the mitigation logic is an event. Accordingly, the mitigation logic is an event.

In another aspect the mitigation measure is a measure selected from the group comprising:
 Adapting the multi-component system;
 Adapting at least one component of the multi-component system;
 Extending the multi-component system with at least one additional component; and
 Adapting at least one input data set and/or at least one output data set of at least one component of the multi-component system.

In another aspect, the Adaptation of the at least one input data set and/or at least one output data set of the at least one component of the multi-component system, comprises the step: Adapting a training data set and/or a validation data set of at least one software component, at least one Machine-Learning model or at least one Artificial Intelligence model to adapt the predictions of the model and/or adapting at least one Machine-Learning model or at least one Artificial Intelligence model.

The advantage is that appropriate mitigation measures can be performed in a timely manner to mitigate the at least one function failure and/or at least one functional deficiency and also the related hazard.

A further aspect of embodiments of the invention is a computing unit e.g. robot unit or another autonomous unit.

The unit may be realized as any devices, or any means, for computing, in particular for executing a software, an app, or an algorithm. For example, the unit may consist of or comprise a central processing unit (CPU) and/or a memory operatively connected to the CPU. The unit may also comprise an array of CPUs, an array of graphical processing units (GPUs), at least one application-specific integrated circuit (ASIC), at least one field-programmable gate array, or any combination of the foregoing. The unit may comprise at least one module which in turn may comprise software and/or hardware. Some, or even all, modules of the unit may be implemented by a cloud computing platform.

BRIEF DESCRIPTION

Some of the embodiments will be described in detail, with reference to the following figures, wherein like designations denote like members, wherein.

DETAILED DESCRIPTION

Figure 1:
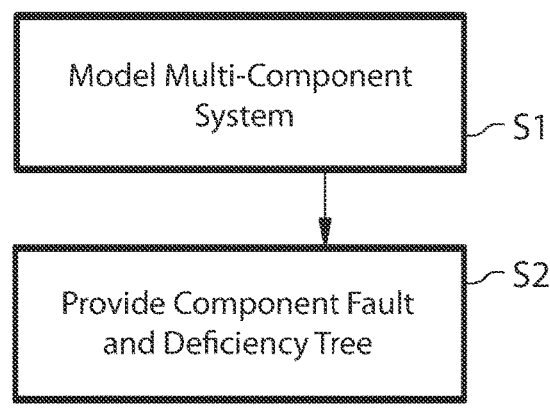
FIG. 1 shows a schematic diagram of the method according to an embodiment of the invention.

FIG. 1 illustrates a flowchart of the method according to embodiments of the invention with the method steps S1 to S2. In the first step S1, the multi-component system is modeled using a Component Fault and Deficiency Tree (CFDT) 1.

The CFDT 1 comprises respective component fault and deficiency tree elements 10. The elements 10 each comprise at least one internal fault tree logic 20 and at least one mitigation logic 30. Thereby, the internal fault tree logic 20 is designed as event, which is associated with at least one failure 22 and at least one deficiency 24 of the component. This is in contrast to conventional art, since, in other words, deficiencies are incorporated in the CFDT 1. The mitigation logic 30 is configured to mitigate the at least one failure 22 and/or at least one deficiency 24 by means of a mitigation measure.

In the last step S2, the Component Fault and Deficiency Tree (CFDT) 1 is provided.

According to an embodiment, the Component Fault and Deficiency Tree (CFDT) can be defined as a superset of a CFT (CFDT D CFT) which consists of a set of CFDT elements where each CFDT element is defined by the tuple CFDT=(IFM, OFM, B, D, M, G, SubCFDT, C'). While the definition of IFMs, OFMs, basic events B, and gates G, are the same as in CFTs, the aforementioned definition for CFTs can be extended as follows:
  a set of deficiencies D={$d_1$, $d_t$}, which describe functional deficiencies of the component
  a set of measures M={$M_1$, . . . , $M_u$}, which describe mitigation measures defined either for functional deficiencies or for failures
  a set of sub-CFDT elements SubCFDT which is define by the tuple SubCFDT=(IN, OUT, $cfdt_i$), where IN= {$in_1$, . . . , $in_a$} is a set of input failure mode, OUT={$out_i$, . . . , $out_b$} a set of output failure modes and $cfdt_i \in$ CFDT a mapping to a another CFDT element
  a set of directed edges C' with C'⊆(IFM U B U D U M U G. out U SubCFDT. OUT)×(OFM U G. IN U SubCFDT.IN)

Figure 2:
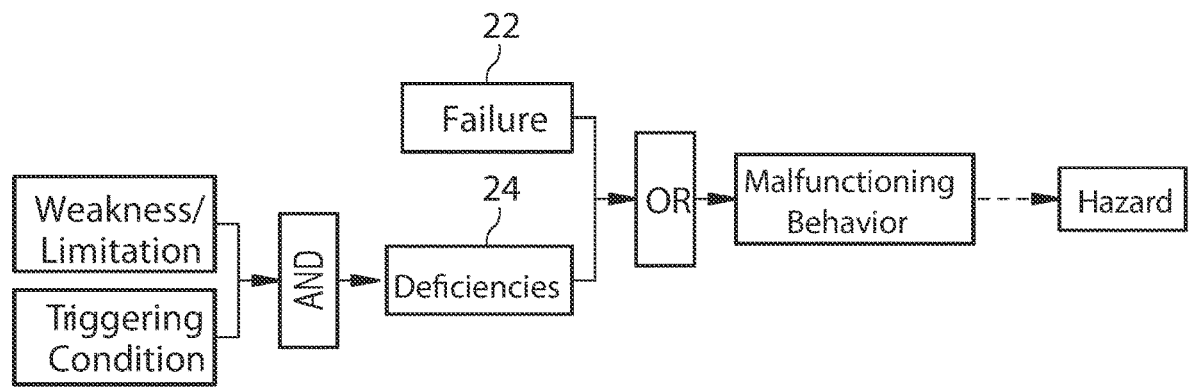
FIG. 2 shows a schematic diagram of the failures and deficiencies assigned to the internal fault tree logic according to an embodiment of the invention.

FIG. 2 shows the failures 22 and deficiencies 24 assigned to the internal fault tree logic 20. The failures 22 and/or deficiencies 24 can lead to a malfunction or malfunctioning behavior within the system which may further lead to a potential hazard at the system boundary, as already explained further above.

Figure 3:
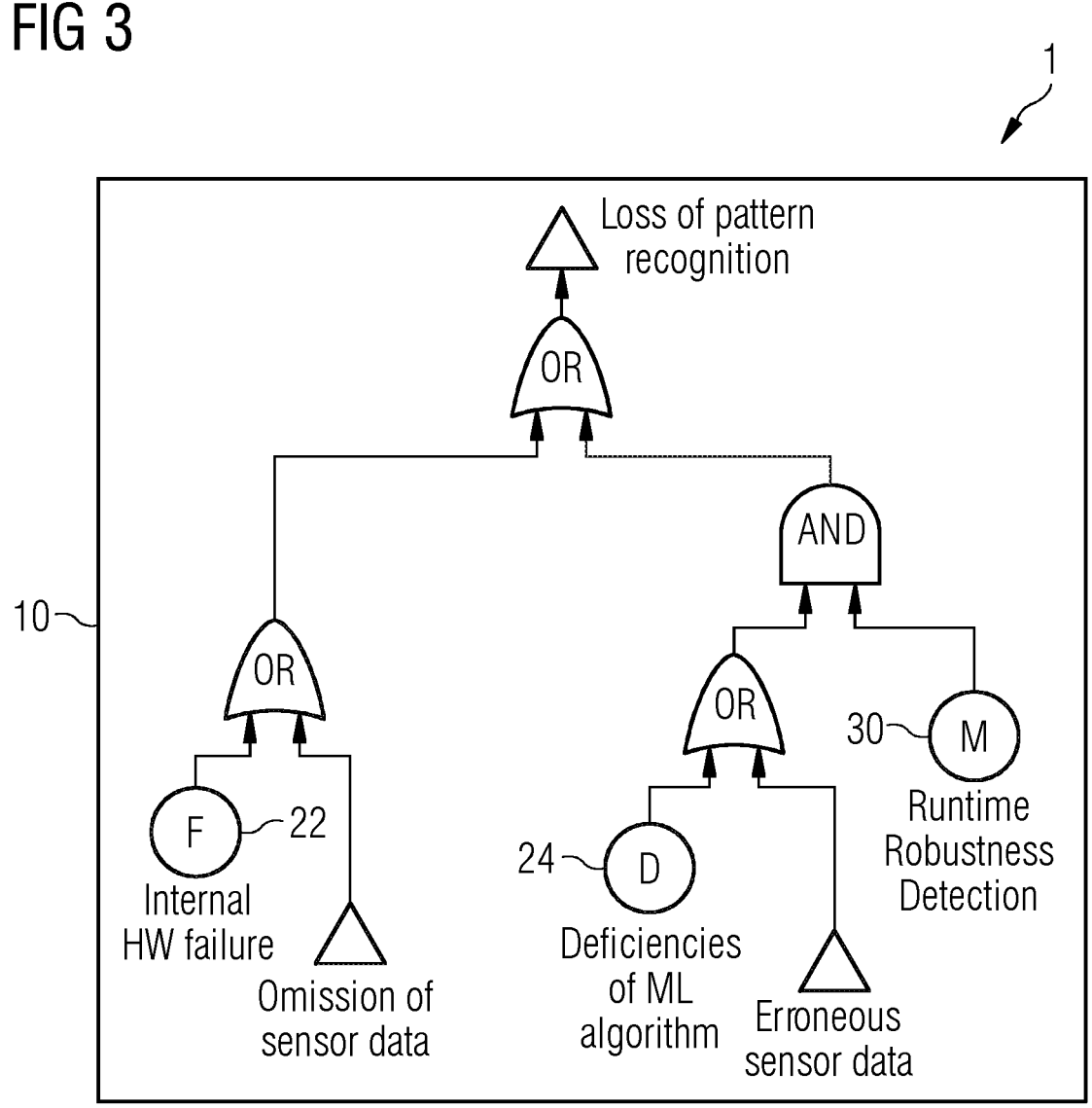
FIG. 3 shows a schematic representation of the Component Fault and Deficiency Tree (CFDT) of a multi-component system according to an embodiment of the invention.

An exemplary CFDT 1 element 10 is shown in FIG. 3. The CFDT element 10 comprises the event 22 "internal HW failure" which represents an internal failure of the component indicated with a circle (F) and the event "deficiencies of ML algorithm" 24 which represents a deficiency indicated with a circle (D). The two events are connected via a Boolean OR-Gate.

Moreover, the CFDT element 10 comprises the mitigation logic 30 tree logic "runtime robustness detection" 30 indicated with a circle (M). The internal fault tree logic 20 and mitigation logic 30 are connected via a Boolean AND-Gate, the input failure modes are indicated with triangles.

The CFDT allows for
1. Qualitative analysis: By describing the cause-effect-relationships for functional deficiencies it is possible to conduct an FMEA-like analysis and to generate an overview table which shows if measures are defined for each deficiency of each component which would otherwise lead to a potentiation hazards (DEA, Deficiency and Effect Analysis).
   Moreover, it is possible to conduct an analysis similar to qualitative Fault Tree Analysis (Minimal Cut Set Analysis) to show which combinations of deficiencies (cut sets) can lead to a specific hazard.
2. Quantitative analysis: Similar to the basic events in CFTs, also deficiencies can be annotated using probabilities which allow the quantitative or probabilistic Fault Tree Analysis using known algorithms to calculate the probability that a specific hazard occurs.
   Moreover, measures can be annotated with a "Diagnostic Coverage (DC)" value (similar to FMEDA). Hence, an FMEDA-like analysis (the so-called DEDA—Deficiency, Effect and Diagnosis Analysis) can be conducted to determine the residual risk that a hazard will occur.
3. Common Cause Deficiencies analysis: The CFDT methodology allows the definition of so-called Common Cause Deficiencies (CCDs) analogous to CCFs. Hence, the CFDT model can also be used to determine the CCDs of a system design.

Use Cases:

Traffic signs such as stop signs must be identified by an ML algorithm in a dependable way, otherwise this could result in a potential crash. The wrong classification of a stop sign is a deficiency of the ML algorithm and not a failure of the system itself. This deficiency must be mitigated in order to avoid hazardous situations, e.g., by extension of the training data w.r.t. potential wrong images or by providing an architecture with a second redundant data source (e.g., a second camera).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:
1. A computer-implemented method for generating a Component Fault and Deficiency Tree of a machine learning-based system with safety-critical functionalities comprising a plurality of components, wherein each component of the plurality of components of the machine learning-based system is a hardware component, a software component, or a hardware and software component, the method comprising:

modeling the machine learning-based system using a Component Fault and Deficiency Tree, wherein the Component Fault and Deficiency Tree comprises a plurality of component fault and deficiency tree elements associated with the respective components of the machine learning-based system; and interconnections between the component fault and deficiency tree elements associated with respective functional dependencies between the components;

wherein each component fault and deficiency tree element comprises at least one inport and at least one outport;

wherein each component fault and deficiency tree element comprises at least one output failure mode, connected to the at least one outport;

wherein each component fault and deficiency tree element comprises at least one input failure mode, connected to the at least one inport;

wherein each component fault and deficiency tree element comprises at least two events as internal fault tree logic;

wherein one event of the at least two events is associated with at least one failure and the other event of the at least two events is associated with at least one deficiency of the component;

wherein at least one gate is configured to connect the at least two events;

wherein each component fault and deficiency tree element comprises at least one mitigation logic;

wherein the at least one mitigation logic is configured to mitigate the at least one failure and at least one deficiency by means of a mitigation measure;

wherein at least one Boolean AND-Gate is configured to connect the internal fault tree logic and the at least one mitigation logic; and providing the Component Fault and Deficiency Tree of machine learning-based system as output; and applying at least one safety analysis technique on the machine learning-based system.

2. The computer-implemented method according to claim 1, wherein each component fault and deficiency tree element comprises at least one additional internal fault tree logic; wherein the at least one additional internal fault tree logic is an event, a gate or a transfer.

3. The computer-implemented method according to claim 1, wherein the at least one mitigation logic is an event.

4. The computer-implemented method according to claim 3, wherein the mitigation measure is a measure selected from the group comprising:

adapting the machine learning-based system;

adapting at least one component of the machine learning-based system;

extending the machine learning-based system with at least one additional component; and adapting at least one input data set and/or at least one output data set of at least one component of the machine learning-based system.

5. The computer-implemented method according to claim 4, wherein the adaptation of the at least one input data set and/or at least one output data set of the at least one component of the machine learning-based system, comprises the step: adapting a training data set and/or a validation data set of at least one software component, desirably at least one Machine-Learning model or at least one Artificial Intelligence model to adapt the resulting predictions of the model and/or adapting at least one Machine-Learning model or at least one Artificial Intelligence model.

6. A computing unit for performing the method steps according to claim 1.

7. A computer program product, comprising a computer readable hardware storage device having computer readable program code stored therein, said program code executable by a processor of a computer system to implement the method according to claim 1.

8. The computer-implemented method according to claim 1, wherein the at least one deficiency is a weakness or a limitation originating from a design or specification or a limitation in an implementation of an intended functionality and a triggering condition.

9. The computer-implemented method according to claim 1, wherein the at least one deficiency is an insufficiency of a decision algorithm.

10. The computer-implemented method according to claim 1, wherein the at least one deficiency is a deficiency of a machine learning algorithm.

11. The computer-implemented method according to claim 1, wherein the at least one deficiency is an incorrect classification in a machine learning algorithm.

* * * * *